US012047860B2

(12) United States Patent
Zhang et al.

(10) Patent No.: US 12,047,860 B2
(45) Date of Patent: Jul. 23, 2024

(54) CLUSTERING ROUTING OPTIMIZATION METHOD BASED ON ADAPTIVE EVOLUTIONARY ALGORITHM FOR WIRELESS SENSOR NETWORK

(71) Applicant: Shanghai Maritime University, Shanghai (CN)

(72) Inventors: Ying Zhang, Shanghai (CN); Xinheng Wang, Shanghai (CN); Lei Chen, Shanghai (CN); Bin Zhang, Shanghai (CN); Jie Wu, Shanghai (CN)

( * ) Notice: Subject to any disclaimer, the term of this patent is extended or adjusted under 35 U.S.C. 154(b) by 321 days.

(21) Appl. No.: 17/762,023

(22) PCT Filed: May 27, 2020

(86) PCT No.: PCT/CN2020/092484
§ 371 (c)(1),
(2) Date: Mar. 18, 2022

(87) PCT Pub. No.: WO2021/051859
PCT Pub. Date: Mar. 25, 2021

(65) Prior Publication Data
US 2022/0353783 A1 Nov. 3, 2022

(30) Foreign Application Priority Data
Sep. 18, 2019 (CN) .......................... 201910880208.X

(51) Int. Cl.
*H04W 84/18* (2009.01)
*H04L 45/00* (2022.01)
(Continued)

(52) U.S. Cl.
CPC ............ *H04W 40/10* (2013.01); *H04L 45/17* (2022.05); *H04L 45/46* (2013.01); *H04W 40/22* (2013.01);
(Continued)

(58) Field of Classification Search
CPC ... H04W 4/005; H04W 4/08; H04W 36/0009; H04W 40/32; H04W 84/18; H04L 45/46
See application file for complete search history.

(56) References Cited

U.S. PATENT DOCUMENTS

2011/0055424 A1* 3/2011 Jiang ..................... H04W 40/32
709/238
2019/0246284 A1* 8/2019 Mackenzie ........... H04W 16/32

FOREIGN PATENT DOCUMENTS

AU 2021102882 A4 7/2021
CN 110602757 A 12/2019
(Continued)

OTHER PUBLICATIONS

Zhao, L., Qu, S., & Yi, Y., "A modified cluster-head selection algorithm in wireless sensor networks based on LEACH", J Wireless Com Network 2018, 287 (2018), pp. 1-8, https://doi.org/10.1186/s13638-018-1299-7. (Year: 2018).*
(Continued)

*Primary Examiner* — Salvador E Rivas
(74) *Attorney, Agent, or Firm* — Le Jiana

(57) ABSTRACT

The present invention discloses a clustering routing optimization method based on adaptive evolutionary algorithm for a wireless sensor network, comprising following steps: performing population initialization by initial position and energy information of sensor nodes; calculating fitness values, and implementing iterative operation of elite preservation, adaptive crossover and mutation; after the iteration, selecting a cluster head; routing data packet of the cluster head to a base station. Convergence process of the evolutionary algorithm is improved by nonlinearly adjusting the probability of crossover and mutation; upper and lower bound of crossover and mutation operators are dynamically adjusted by fitness value; adding an incentive factor, adjusting the crossover and mutation probability when the fitness
(Continued)

value tends to converge, and running the algorithm again to confirm that a new optimal value is generated. The global search capability and convergence speed of the algorithm are improved by the above method, and avoiding local convergence.

2 Claims, 8 Drawing Sheets

(51) Int. Cl.
  *H04L 45/17* (2022.01)
  *H04W 40/10* (2009.01)
  *H04W 40/22* (2009.01)
  *H04W 40/32* (2009.01)
  *H04W 4/08* (2009.01)
  *H04W 36/00* (2009.01)

(52) U.S. Cl.
  CPC ........... *H04W 40/32* (2013.01); *H04W 84/18* (2013.01); *H04W 4/08* (2013.01); *H04W 36/0009* (2018.08)

(56) References Cited

FOREIGN PATENT DOCUMENTS

| | | | |
|---|---|---|---|
| CN | 108055685 B | * 6/2020 | ............ H04W 40/10 |
| CN | 111698706 A | 9/2020 | |
| CN | 113423130 A | 9/2021 | |
| CN | 113596951 A | 11/2021 | |
| CN | 110958659 B | 2/2022 | |

OTHER PUBLICATIONS

X. Haiyan and X. Haiying, "A Modified Cluster Head Selection Algorithm Based on Random Waiting", 2008 IEEE International Conference on Networking, Sensing and Control, Sanya, China, 2008, pp. 129-132, doi: 10.1109/ICNSC.2008.4525196. (Year: 2008).*

* cited by examiner

CLUSTERING ROUTING OPTIMIZATION METHOD BASED ON ADAPTIVE EVOLUTIONARY ALGORITHM FOR WIRELESS SENSOR NETWORK

CROSS-REFERENCE TO RELATED APPLICATIONS

The subject application is a continuation-in-part of PCT/CN2020/092484 filed on May 27, 2020, which claims priority on Chinese patent application 201910880208X filed on Sep. 18, 2019 in China. The contents and subject matter of the PCT international application and Chinese priority application are incorporated herein by reference.

FIELD OF INVENTION

The present disclosure relates to the field of clustering routing optimization method for Wireless Sensor Networks (WSNs) and specifically relates to an adaptive evolutionary algorithm-based clustering routing optimization method for WSNs.

BACKGROUND ART

Wireless Sensor Networks are generally composed of a large number of miniature battery-powered intelligent sensor nodes with the function of mutual autonomous transmission of information. These nodes possess the capabilities to sense some physical/chemical characteristics of the surrounding environment, such as sound, pressure, moisture, temperature or chemical concentration of a component, etc. And each sensor node has the ability to perform simple calculations and communicate with other nodes or a sink node. The node will transmit the collected data to a base station and then to the data center for further data analysis and processing, so as to obtain corresponding analysis conclusions and decision basis. WSNs have been widely employed in various fields, including forest monitoring, marine hydro-meteorological monitoring, urban air quality monitoring, water quality monitoring, building security, etc.

Due to the good scalability and easy energy management, load balancing and resource allocation of the clustering network structure, it has been widely used in practice, and the clustering routing protocols for WSNs have become a research hotspot. The energy of the nodes in WSNs is provided by their own miniature batteries, which are not easily replaced in many applications, so the usage time of WSNs is usually limited by the battery power. In the clustering routing method, the cluster head sends the fused data to the sink node after fusing the data of the cluster, which reduces the amount of data sent and the energy consumption. The cluster head is responsible for cluster establishment, intra-cluster communication control and communication between the cluster and the sink node.

In the process of designing and deploying WSNs, the variable deployment environment and the limited energy of the nodes can easily cause unbalanced load on each node when transmitting data, making some nodes run out of energy prematurely and reducing the network lifetime; additionally, most existing clustering routing protocols that apply complex intelligent algorithms suffer from high computational complexity and poor real-time routing. Therefore, how to make full use of the limited network node energy to prolong the network lifetime, improve the real-time of network routing and improve the data transmission efficiency have become an urgent problem to be resolved.

SUMMARY OF THE INVENTION

The present disclosure provides the adaptive evolutionary algorithm-based clustering routing optimization method for WSNs to tackle the problem of low efficiency and poor real-time optimization of WSNs clustering, resulting in poor optimization effect and affecting network life cycle and data transmission efficiency.

In order to solve the above technical problem, the present embodiment provides a method for clustering routing optimization in WSNs based on an adaptive evolutionary algorithm, comprising the following steps:

Step 1, deploying a multitude of sensor nodes randomly in a monitoring area, establishing a network energy consumption model, acquiring a distance between each pair of the multitude of sensor nodes according to a received signal strength.

Performing population initialization according to a multitude of initial positions and energy information of the multitude of the sensor nodes, setting q as a number of iteration, with an initial value of q=0; setting $q_{max}$ as a maximum number of iteration, and $q_{max}$ being a positive integer greater than 30:

Denoting a size of a population as m, an x-th individual in the population as C(x), assigning a length of each individual to be a number of the multitude of sensor nodes n, thus obtaining a population set as $$Pop = \bigcup_{x=1}^{m} C(x),$$

a set of individuals as $C(x)=\{B_1, B_2, B_3, \ldots, B_n\}$, wherein $B_i$ denoting a value of a gene on an i-th individual, $B_i$ being determined by energy of node $S_i$, an average energy of surviving nodes in the network and a threshold T(s), wherein T(s) being shown as:

$$T(s) = \begin{cases} \dfrac{p}{1 - p \times [r \bmod(1/p)]} & \text{if } s \in G \\ 0 & \text{otherwise} \end{cases};$$

wherein, p being a ratio of a number of cluster heads to a total number of nodes, p=0.05, r being a number of current rounds, and G being a set of nodes failing to become a cluster head in previous 1/p rounds.

Randomly generating a 0~1 random number for each node and comparing it with a threshold T(s), if it being less than or equal to the T(s) and energy of node $S_i$ being greater than or equal to the average energy of the surviving nodes in the current network, $B_i=1$, selecting node $S_i$ as the cluster head; when the node energy being greater than 0 but less than the average energy, $B_i=0$; when the node energy being less than 0, $B_i=-1$, discriminant formula for $B_i$ being:

$$C(x, i) = B_i = \begin{cases} 1 & S_i.E \geq E_{avgAlive},\ rand \leq T(s) \\ 0 & 0 \leq S_i.E < E_{avgAlive} \\ -1 & S_i.E < 0 \end{cases},$$

wherein $S_i \cdot E$ representing a remaining energy of node $S_i$, $E_{avgAlive}$ denoting an average energy of surviving nodes in the network.

Step 2, constructing a fitness function of the evolutionary algorithm for the x-th individual as:

$$f(x) = \frac{E_{avg} + E_{next-avg} + D_{degreen}}{E_{sum}},$$

$$E_{sum} = e^{E_{sum1} + E_{sum2}},$$

$$E_{sum1} = \frac{sumD_{CH \to BS}(x) - minpopD_{CH \to BS} + 1}{1 + avgpopD_{CH \to BS}},$$

$$E_{sum2} = \frac{sumD_{S \to CH}(x) - minpopD_{S \to CH} + 1}{1 + avgpopD_{S \to CH}},$$

wherein $E_{avg}$ denoting the average energy of the node, $E_{next-avg}$ representing the average energy of the next-hop node, $D_{degreen}$ being the average node degree of next-hop node, $sumD_{CH \to BS}(x)$ representing the sum of the distances from said each cluster head node to the base station, and $sum_{DS \to CH}(x)$ denoting the sum of the distances from said each member node to the corresponding cluster head, $minpopD_{CH \to BS}$ denoting a minimum value of the sum of the distances from each cluster head nodes to the base station for all individuals in the population, $minpopD_{S \to C}$ representing a minimum value of the sum of the distances from the member nodes of all individuals in the population to the corresponding cluster head, $avgpopD_{CH \to BS}$ denoting an average of the sum of the distances from said each cluster head node to the base station for all individuals in the population, $avgpopD_{S \to SH}$ representing an average of the sum of the distances from the member nodes to the corresponding cluster head for all individuals in the population.

Step 3, constructing an adaptive crossover probability formula as:

$$P_c(x) = P_{c2} + \frac{P_{c1} - P_{c2}}{1 + P_e}, P_e = e^{10 \cdot \frac{f(x) - f_{avg}}{f_{max} - f_{avg}}},$$

wherein $P_{c1}$ and $P_{c2}$ being upper and lower bound of crossover probability adaptive adjustment, respectively; upper bound being: $P_{c1} = F_1(f'(x)) = P_c - \Delta f'(x)*(-0.1)$, $P_{c2} < P_{c1} \leq 0.97$, when $P_{c1}$ being greater than 0.97, upper bound of crossover probability being set to 0.97, $\Delta f'(x)$ being a variation trend of the fitness value $f(x)$, and the lower bound $P_{c2} = 0.1$, $f_{max}$ being a maximum value of individuals fitness value in the population, $f_{avg}$ being an average value of individuals fitness value in the population.

Step 4, constructing an adaptive mutation probability formula as:

$$P_m(x) = P_{m2} + \frac{P_{m1} - P_{m2}}{1 + P_e}, P_e = e^{10 \cdot \frac{f(x) - f_{avg}}{f_{max} - f_{avg}}},$$

wherein $P_{m1}$ and $P_{m2}$ being upper and lower bound of mutation probability adjustment, respectively; the upper bound being: $P_{m1} = F_2(f'(x)) = P_m - \Delta f'(x)*(-0.01)$, and lower bound $P_{m2} = 0.01$, $p_{m2} < p_{m1} \leq 0.1$, when the $P_{m1}$ being greater than 0.1, the upper bound of mutation probability being set to 0.1, $\Delta f'(x)$ being the variation trend of the fitness value $f(x)$, $f_{max}$ being the maximum value of individuals fitness value in the population, $f_{avg}$ being the average value of individuals fitness value in the population.

Step 5, constructing a selection strategy: while preserving the individual H with the highest fitness value in the current population, letting individual H continue to participate in crossover and mutation operations, and if a worst-performing individual L in the next generation having a smaller fitness value than individual H in the previous generation, replacing individual L directly with individual H, defining two sets as:

$$\begin{cases} C_{max} = \{C_{max}(k): f[C_{max}(k)] = \max[f(C(k))] | C_{max}(k) \in \text{Pop }(k), k = 1, 2, \ldots \} \\ C_{min} = \{C_{min}(k): f[C_{min}(k)] = \min[f(C(k))] | C_{min}(k) \in \text{Pop }(k), k = 1, 2, \ldots \} \end{cases},$$

wherein $C_{max}(k)$ and $C_{min}(k)$ representing an optimal and inferior individuals in the k-th generation population Pop(k), respectively, $f[C_{max}(k)]$ and $f[C_{min}(k)]$ being the fitness value of the corresponding individual, if $f[C_{max}(k)] > f[C_{min}(k+1)]$, then $C_{min}(k+1) = C_{max}(k)$, $f[C_{min}(k+1)] = f[C_{max}(k)]$.

Step 6, calculating the fitness value according to the fitness function in Step 2, q=q+1; performing selection, adaptive crossover and mutation operations based on the fitness value to generate new populations; with each point on the individual having a chance of crossover and mutation, upper and lower bounds of the crossover and mutation operators being adjusted with a trend of the fitness values, and probabilities of crossover and mutation being adjusted nonlinearly with the size of the individual fitness values; most individuals in the population that being smaller than the average performing crossover and mutation with a high probability, and a multitude of excellent individuals larger than the average performing crossover and mutation with a lower probability.

Step 7, activating a perturbation incentive factor $\delta_T$ to avoid local convergence at convergence of the fitness value, the convergence denoting that a change rate of fitness value obtained by continuously calculating the fitness value function for 5 times is less than 0.01 after Step 6, T being the moment when the algorithm tends to converge, adjusting the crossover probability $P_c$ to 0.5 and the mutation probability $P_m$ to 0.05, and proceeding to Step 6, calculating the fitness value, if no larger fitness value being generated, it being considered that the algorithm is currently converging to the optimal state, proceeding to step 9; if a better fitness value being produced, continuing to perform step 8.

Step 8, determining whether the q reaches the iteration stopping condition that iterations reach the number of settings $q_{max}$, if $q < q_{max}$, proceeding to step 6; if $q = q_{max}$, proceeding to step 9.

Step 9, clustering a multitude of network nodes according to the clustering scheme in the population individuals, determining whether the cluster head is within the communication range of the base station, if yes, the cluster head communicating directly with the base station; otherwise, selecting the cluster head node as the relay node that is closer to the base station than the current cluster head, routing the data packet to the relay node until the packet is delivered to the base station.

Further, $q_{max}$ is between 500 and 600.

Establishing the network energy consumption model, if the node needs to transmit one bit data to the node whose distance from the node is d, the energy consumption of the node is:

$$E_{Tx}(l, d) = \begin{cases} l \times E_{elec} + l \times \varepsilon_{fs} \times d^2 & \text{if } d < d_0 \\ l \times E_{elec} + l \times \varepsilon_{mp} \times d^4 & \text{if } d \geq d_0 \end{cases},$$

wherein $d_0 = \sqrt{\varepsilon_{fs}/\varepsilon_{mp}}$ denotes a distance threshold, $E_{elec}$ represents an energy consumed to transmit or receive one bit data, $\varepsilon_{fs}$ and $\varepsilon_{mp}$ indicate power amplification factor at different communication distances.

The present disclosure provides the clustering routing optimization method of WSNs based on adaptive evolutionary algorithm, which improves the selection, crossover and mutation mechanism of evolutionary algorithm. Dynamically adjusting the upper and lower bounds of the crossover and mutation operator in the algorithm. According to the change trend of fitness value, when the change rate becomes slow, increasing its upper limit to make it approach the optimal combination faster. When the change rate becomes fast, reducing the upper limit to avoid too fast local convergence. At the same time, adding the incentive factor. When the fitness value tends to smooth, the incentive factor works and gives a quantitative number of times for trying to change. If it does not affect the optimal value, then this is the optimal fitness value. The above adjustment improves the global search ability and convergence speed of the algorithm, solving the problem of poor real-time performance of clustering routing protocol by employing intelligent optimization algorithms. In the clustering process, the cluster heads are selected by considering five factors: the distance between each node and cluster head node, the distance between cluster head node and base station, the remaining energy of each node, the average energy of next-hop node and the node degree of next-hop node. The cluster head node calculates the distance between neighboring cluster heads and communicates with the base station by multi-hop according to the result, which improves the network lifetime and data transmission efficiency.

EMBODIMENTS

The clustering routing optimization method of WSNs based on adaptive evolutionary algorithm proposed by the disclosure is further described in detail below in combination with the attached drawings and specific embodiments. According to the following description and claims, the advantages and features of the disclosure will be clearer. It should be noted that the drawings adopt a very simplified form and employ imprecise ratios, which are only used to facilitate and clearly illustrate the purpose of the embodiment.

The core idea of the present disclosure: The present disclosure provides a clustering routing optimization method of WSNs based on adaptive evolutionary algorithm, which adjusts the upper and lower bounds of the crossover and mutation operator, and improves the selection, crossover and mutation mechanism of evolutionary algorithm. In the initial convergence, the activation of the incentive factor can increase the opportunity of attempts, improving the global search ability and convergence speed of the algorithm, and avoiding falling into local optimum, solving the problem of poor real-time performance of clustering by employing intelligent optimization algorithms. In the clustering process, the cluster heads are selected by considering five factors: the distance between each node and cluster head node, the distance between cluster head node and sink node, the remaining energy of each node, the average energy of next-hop node and the node degree of next-hop node. The cluster head node calculates the distance between neighboring cluster heads and communicates with the base station by multi-hop according to the result, improving the network lifetime and data transmission efficiency.

Figure 1:
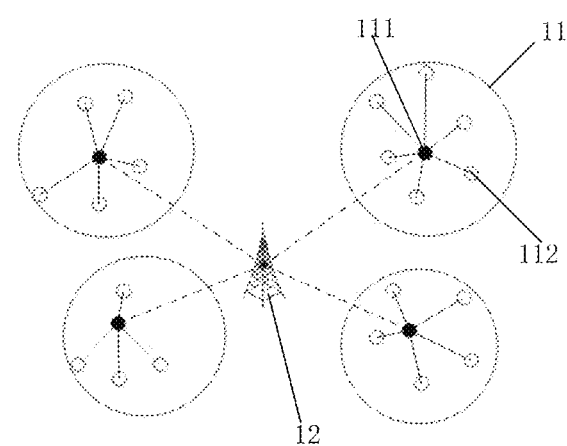
FIG. 1 is a schematic diagram showing the adaptive evolutionary algorithm-based clustering routing optimization method for WSNs of the present disclosure.

FIG. 1 is a schematic diagram showing the adaptive evolutionary algorithm-based clustering routing optimization method for WSNs of the present disclosure. As shown in FIG. 1, the network structure of a clustering routing optimization method for WSNs based on the adaptive evolutionary algorithm includes a number of cluster type structures 11 and base station 12. Each cluster type structures 11 contains a cluster head node 111 and a number of common nodes 112. The sensor nodes collect data information from the surrounding environment and transmit the collected data to the base station 12 by multi-hop for further analysis and processing.

Figure 2:
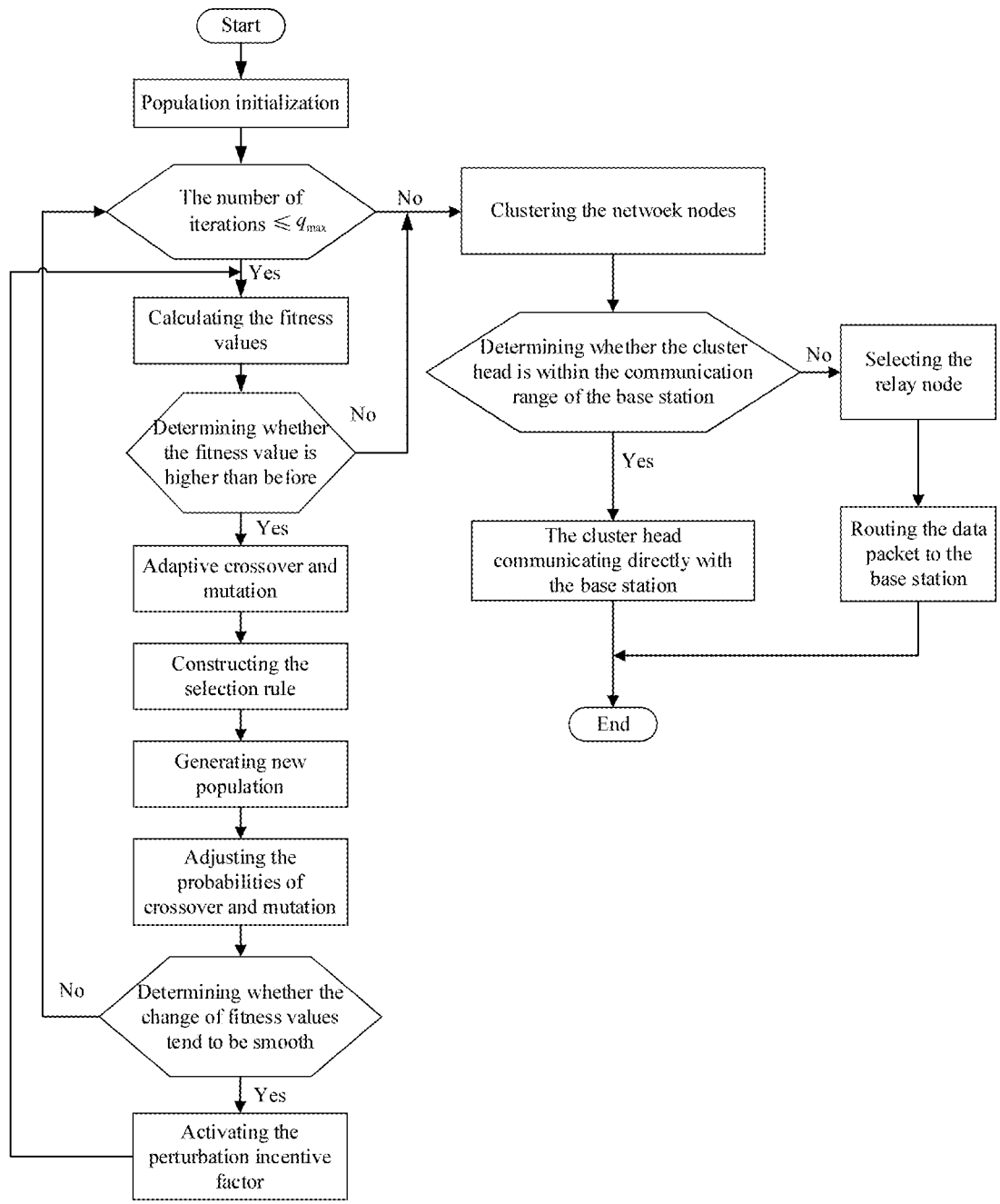
FIG. 2 is a flow chart showing the adaptive evolutionary algorithm-based clustering routing optimization method for WSNs of the present disclosure.

FIG. 2 is a flow chart showing the adaptive evolutionary algorithm-based clustering routing optimization method for WSNs of the present disclosure. As shown in FIG. 2, the clustering routing optimization method based on the adaptive evolutionary algorithm for WSNs, and comprises the following steps:

Step 1, deploying a multitude of sensor nodes randomly in a monitoring area, establishing a network energy consumption model, acquiring a distance between each pair of the multitude of sensor nodes according to a received signal strength.

Step 2, performing population initialization according to a multitude of initial positions and energy information of the multitude of the sensor nodes, setting q as a number of iteration, with an initial value of q=0; setting $q_{max}$ as a maximum number of iteration, and $q_{max}$ being a positive integer greater than 30.

Step 3: calculating the fitness value according to the fitness function in Step 2, q=q+1; performing elite preservation, adaptive crossover and mutation operations based on fitness values to generate new populations, each point on an individual has a chance of crossover and mutation, the upper and lower bounds of the crossover and mutation operators are adjusted with the trend of the fitness values, and the probabilities of crossover and mutation are adjusted nonlinearly with the size of the individual fitness values, when the fitness value tends to converge, the incentive factor is activated to avoid local convergence, the convergence denotes that a change rate of fitness value obtained by continuously calculating the fitness value function for 5 times is less than 0.01, adjusting the crossover and mutation probabilities, and calculating the fitness function anew.

Step 4, determining whether the q reaches the iteration stopping condition that iterations reach the number of settings $q_{max}$, if $q<q_{max}$, proceeding to step 6; if $q=q_{max}$, proceeding to step 3.

Step 5: determining whether the cluster head is within the communication range of the base station, if yes, the cluster head communicates directly with the base station; otherwise, selecting the cluster head node as the relay node that is closer to the base station than the current cluster head, routing the data packet to the relay node until the packet is delivered to the base station.

In the step of Step 1, establishing the network energy consumption model, if the node needs to transmit one bit data to the node whose distance from the node is d, the energy consumption of the node is:

$$E_{Tx}(l,d) = \begin{cases} l \times E_{elec} + l \times \varepsilon_{fs} \times d^2 & \text{if } d < d_0 \\ l \times E_{elec} + l \times \varepsilon_{mp} \times d^4 & \text{if } d \geq d_0 \end{cases},$$

wherein $d_0 = \sqrt{\varepsilon_{fs}/\varepsilon_{mp}}$ denotes the distance threshold, $E_{elec}$ represents the energy consumed to transmit or receive one bit data, $\varepsilon_{fs}$ and $\varepsilon_{mp}$ indicate the power amplification factor at different communication distances.

In the step of Step 2, performing population initialization according to a multitude of initial positions and energy information of the multitude of the sensor nodes, setting a number q as fitness value calculation and counting each time to judge whether the calculation being terminated:

Denoting a size of a population as m, an x-th individual in the population as C(x), assigning a length of each individual to be a number of the multitude of sensor nodes n, thus obtaining a population set as $$Pop = \bigcup_{x=1}^{m} C(x),$$

a set of individuals as $C(x) = \{B_1, B_2, B_3, \ldots B_i, \ldots, B_n\}$, wherein $B_i$ denoting a value of a gene on an i-th individual, $B_i$ being determined by energy of node $S_i$, an average energy of surviving nodes in the network and a threshold T(s); wherein T(s) being shown as:

$$T(s) \begin{cases} \dfrac{p}{1-p \times [r\bmod(1/p)]} & \text{if } s \in G \\ 0 & \text{otherwise} \end{cases};$$

wherein, p being a ratio of a number of cluster heads to a total number of nodes, r being a number of current rounds, and G being a set of nodes failing to become a cluster head in previous 1/p rounds, p=0.05, m=20.

Each node randomly generates a 0~1 random function and comparing it with a threshold T(s), if it is less than or equal to the T(s) and the energy of node $S_i$ is greater than or equal to the average energy of the surviving nodes in the current network, B=1, selecting the node $S_i$ as the cluster head; when the node energy is greater than 0 but less than the average energy, $B_i=0$; when the node energy is less than 0, $B_i=-1$, the discriminant formula for $B_i$ is:

$$C(x,i) = B_i = \begin{cases} 1 & S_i.E \geq E_{avgAlive}, rand \leq T(s) \\ 0 & 0 \leq S_i.E < E_{avgAlive} \\ -1 & S_i.E < 0 \end{cases},$$

wherein $S_i \cdot E$ represents the remaining energy of node $S_i$, $E_{avgAlive}$ denotes the average energy of surviving nodes in the network.

In the step of Step 3, calculating the fitness values: the x-th individual fitness function in the population is $$f(x) = \frac{E_{avg} + E_{next-avg} + D_{degreen}}{E_{sum}},$$

$$E_{sum} = e^{E_{sum1} + E_{sum2}},$$

$$E_{sum1} = \frac{sumD_{CH \to BS}(x) - minpopD_{CH \to BS} + 1}{1 + avgpopD_{CH \to BS}},$$

$$E_{sum2} = \frac{sumD_{S \to CH}(x) - minpopD_{S \to CH} + 1}{1 + avgpopD_{S \to CH}},$$

wherein $E_{avg}$ denotes the average energy of the node, $E_{next}$ represents the average energy of the next-hop node, $D_{degreen}$ is the average node degree of next-hop node, $sumD_{CH \to BS}$ (x) represents sum of the distance from each cluster head nodes to the base station, and $sumD_{S \to CH}$ (x) denotes sum of distances from member nodes to the corresponding cluster head, $minpopD_{CH \to BS}$ denotes the minimum value of the sum of the distances from each cluster head nodes to the base station for all individuals in the population, $minpopD_{S \to CH}$ represents the minimum value of the sum of the distances from the member nodes of all individuals in the population to the corresponding cluster head, $avgpopD_{CH \to BS}$ denotes the average of the sum of the distances from each cluster head nodes to the base station for all individuals in the population, $avgpop_{S \to CH}$ represents the average of the sum of the distances from the member nodes to the corresponding cluster head for all individuals in the population.

Elite preservation: while preserving the individual H with the highest fitness value in the current population, letting individual H continue to participate in crossover and mutation operations, and if the worst-performing individual L in the next generation has a smaller fitness value than individual H in the previous generation, replacing individual L directly with individual H, defining two sets as:

$$\begin{cases} C_{max} = \{C_{max}(k) \colon f[C_{max}(k)] = \\ \max[f(C(k))] \mid C_{max}(f) \in Pop(k), k = 1, 2, \ldots\} \\ C_{min} = \{C_{min}(k) \colon f[C_{min}(k)] = \\ \min[f(C(k))] \mid C_{min}(f) \in Pop(k), k = 1, 2, \ldots\} \end{cases},$$

wherein $C_{max}(k)$ and $C_{min}(k)$ representing the optimal and inferior individuals in the k-th generation population Pop(k), respectively, $f[C_{max}(k)]$ and $f[C_{min}(k)]$ are the fitness value of the corresponding individual, if $f[C_{max}(k)] > f[C_{min}(k+1)]$, then $C_{min}(k+1) = C_{max}(k)$, $f[C_{min}(k+1)] = f[C_{max}(k)]$.

In traditional evolutionary algorithms, individuals who perform simply crossover and mutation operation with each other are likely to destroy the better individuals. This does not achieve the purpose of accumulating better genes, but rather destroy the otherwise good genes. In order to prevent the loss of the optimal individual of the current population in the next generation, resulting in the genetic algorithm cannot converge to the global optimal solution, the present embodiment implements the elite preservation strategy. While preserving the individual H with the highest fitness value in the current population, letting individual H continue to participate in crossover and mutation operations, and if the worst-performing individual L in the next generation has a smaller fitness value than individual H in the previous generation, replacing individual L directly with individual H. The elite preservation strategy prevents optimal individuals from being destroyed by crossover and mutation operations.

Figure 3:
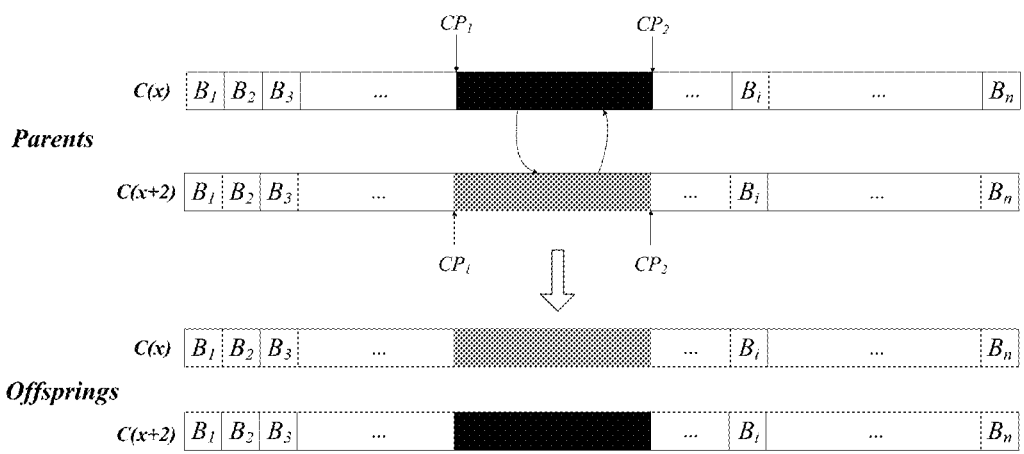
FIG. 3 is a schematic diagram showing the adaptive crossover operation module of the present embodiment.

FIG. 3 is a schematic diagram showing the adaptive crossover operation module of the present embodiment 1. As shown in FIG. 3, the crossover operation is to interchange and recombine parts of two chromosomes to produce two new individuals. Through crossover recombination, the search ability of the genetic algorithm is greatly improved. The embodiment of the present disclosure adopts the mode of two-point crossover, firstly, a random number $C_{rand}(x)$ in the range of 0~1 is randomly generated for individual x in the population. When $C_{rand}(x) \leq P_c(x)$, two gene cut points $CP_1$ and $CP_2$ are randomly selected on individual x, exchanging the genes between $CP_1$ and $CP_2$ on individual x with the corresponding position of individual x+2.

Figure 4:
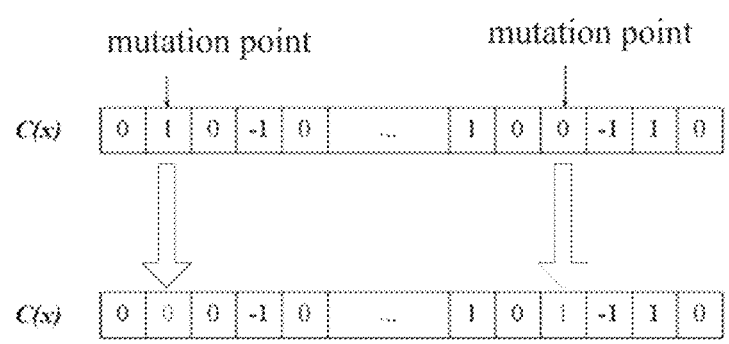
FIG. 4 is a schematic diagram showing the adaptive mutation operation module of the present embodiment.

FIG. 4 is a schematic diagram showing the adaptive mutation operation module of the present embodiment. As shown in FIG. 4, during the evolutionary process, there may be some errors leading to gene mutation. The mutation operation is based on this phenomenon, setting the mutation probability, some gene values on the chromosome are mutated in order to increase the diversity of the population and avoiding falling into a local optimum. Firstly, a random number $M_{rand}(B_i)$ in the range 0~1 is randomly generated for each gene on individual x. When $M_{rand}(B_i) \leq P_c(x)$, replacing the mutated gene value $B_i$. For node $S_i$, it becomes 1 when the corresponding $B_i=0$ and vice versa.

In traditional evolutionary algorithms, the crossover probability $P_c$ and the mutation probability $P_m$ are usually certain values. If $P_c$ or $P_m$ is too large, the structure of individuals with higher fitness values will be easily destroyed, and the algorithm will fall into random search, losing the meaning of iterative optimization of genetic algorithm. If $P_c$ or $P_m$ is too small, the generation of new individuals in the population will also become difficult, leading to a stagnation of the evolutionary process and falling into local optimum. Therefore, when employing classical genetic algorithm to solve different problems, it is necessary to adjust until the appropriate crossover probability and mutation probability are selected, increasing the workload. In order to address this problem, some researchers have proposed a new adaptive genetic algorithm (NAGA). In order to avoid falling into local optimum, NAGA improves the crossover and mutation operators on the basis of AGA, which is defined as:

$$P_c = \begin{cases} \dfrac{P_{c1}(f_{avg} - f') + P_{c2}(f - f_{min})}{f_{avg} - f_{min}} & f' < f_{avg} \\ \dfrac{P_{c2}(f_{avg} - f') + P_{c3}(f' - f_{min})}{f_{max} - f_{avg}} & f' \geq f_{avg} \end{cases}$$

$$P_m = \begin{cases} \dfrac{P_{m1}(f_{avg} - f') + P_{m2}(f - f_{min})}{f_{avg} - f_{min}} & f' < f_{avg} \\ \dfrac{P_{m2}(f_{avg} - f') + P_{m3}(f' - f_{min})}{f_{max} - f_{avg}} & f' \geq f_{avg} \end{cases}$$

wherein, $f_{max}$ is the maximum fitness value, $f_{avg}$ is the average fitness value, $f_{min}$ is the minimum fitness value, f' is the larger fitness value of the two crossed individuals, and $ff$ is the fitness value of the current individual, $P_{c1}>P_{c2}>P_{c3}$, $P_{m1}>P_{m2}>P_{m3}$.

Although NAGA avoids the algorithm from the local optimum in a certain extent, it ignores the number distribution of individuals. If the method in NAGA is adopted, and the crossover and mutation probability can be adjusted linearly with the size of the individual fitness value, a multitude of excellent individual structures in the population may still be destroyed.

Therefore, $P_c$ and $P_m$ should change slowly and remain at higher levels when individual fitness values are low; $P_c$ and $P_m$ should change equally slowly and remain at higher levels when individual fitness values are high. This operation maintains population diversity while preserving more structures of superior individuals. Crossover and mutation probabilities should be adjusted nonlinearly with the size of individual fitness values. In order to realize this adaptive nonlinear change of crossover and mutation probability, embodiment of the invention adopts sigmoid function to quantify the adaptive adjustment of crossover and mutation probability. The top and bottom of sigmoid function are relatively smooth, which can meet the requirements of this paper on the nonlinear change of crossover and mutation probability.

The crossover and mutation formula based on sigmoid function provided by embodiment of the invention is as follows:

Adaptive crossover probability formula is:

$$P_c(x) = P_{c2} + \frac{P_{c1} - P_{c2}}{1 + P_e}, \quad P_e = e^{10 \cdot \frac{f(x) - f_{avg}}{f_{max} - f_{avg}}},$$

wherein $P_{c1}$ and $P_{c2}$ are the upper and lower bound of crossover probability adjustment, respectively; the upper bound is: $P_{c1}=F_1(f'(x))=P_c-\Delta f(x)*(-0.1)$, $P_{c2}<P_{c1}\leq 0.97$, when the $P_{c1}$ is greater than 0.97, the upper bound of crossover probability is set to 0.97, $\Delta f'(x)$ is the variation trend of the fitness value $f(x)$, and the lower bound $P_{c2}=0.1$, $f_{max}$ is the maximum value of individuals fitness value in the population, $f_{avg}$ is the average value of individuals fitness value in the population.

Adaptive mutation probability formula is:

$$P_m(x) = P_{m2} + \frac{P_{m1} - P_{m2}}{1 + P_e}, \quad P_e = e^{10 \cdot \frac{f(x) - f_{avg}}{f_{max} - f_{avg}}},$$

wherein $P_{m1}$ and $P_{m2}$ are the upper and lower bound of mutation probability adjustment, respectively; the upper bound is: $P_{m1}=F_2(f'(x))=P_c-\Delta f'(x)*(-0.01)$, and the lower bound $P_{m2}=0.01$, $p_{m2}<p_{m1}\leq 0.1$, when the $P_{m1}$ is greater than 0.1, the upper bound of mutation probability is set to 0.1, $\Delta f'(x)$ is the variation trend of the fitness value $f(x)$, $f_{max}$ is the maximum value of individuals fitness value in the population, $f_{avg}$ is the average value of individuals fitness value in the population.

When the change of fitness value tends to be smooth, in order to avoid local optimum, the incentive $\delta_T$ is activated, to solve the problem of premature convergence of the algorithm, adjusting the crossover probability $P_c$ to 0.5 and the mutation probability $P_m$ to 0.05, and proceeding to Step 6, calculating the fitness value. If no larger fitness value is generated, it is considered that the algorithm is currently converging to the optimal state; if a better result is produced, the algorithm needs to continue and try to converge again.

Figure 5:
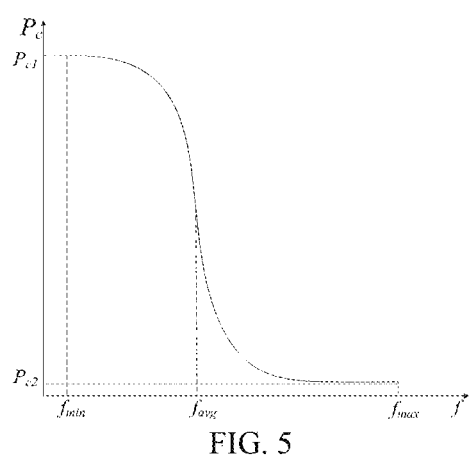
FIG. 5 is a schematic diagram showing the adaptive crossover operator curve of the present embodiment.

FIG. 5 is a schematic diagram showing the adaptive crossover operator curve of the present embodiment. As shown in FIG. 5, the maximum value of individual fitness in the population, giving a smaller crossover probability to avoid falling into a local optimum, the minimum value of the individual fitness value in the population, giving a larger crossover probability to obtain a satisfactory fitness value.

Figure 6:
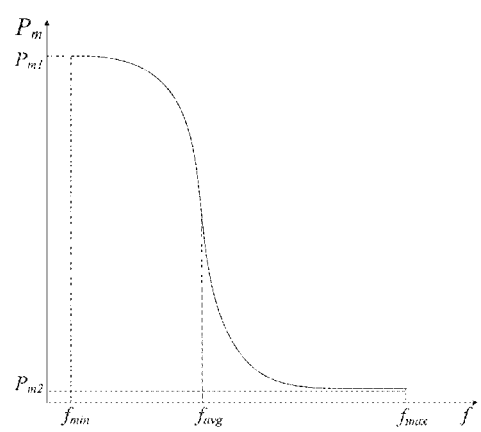
FIG. 6 is a schematic diagram showing the adaptive mutation operator curve of the present embodiment.

FIG. 6 is a schematic diagram showing the adaptive mutation operator curve of the present embodiment. As shown in FIG. 6, for the maximum value of individual fitness in the population, a smaller mutation probability is given to avoid falling into a local optimum, and for the minimum value of the individual fitness value in the population, a larger mutation probability is given to obtain a satisfactory fitness value.

Most individuals below the average value in the population continue to cross and mutate with high probability, while some excellent individuals above the average value continue to cross and mutate with low probability.

Figure 7:
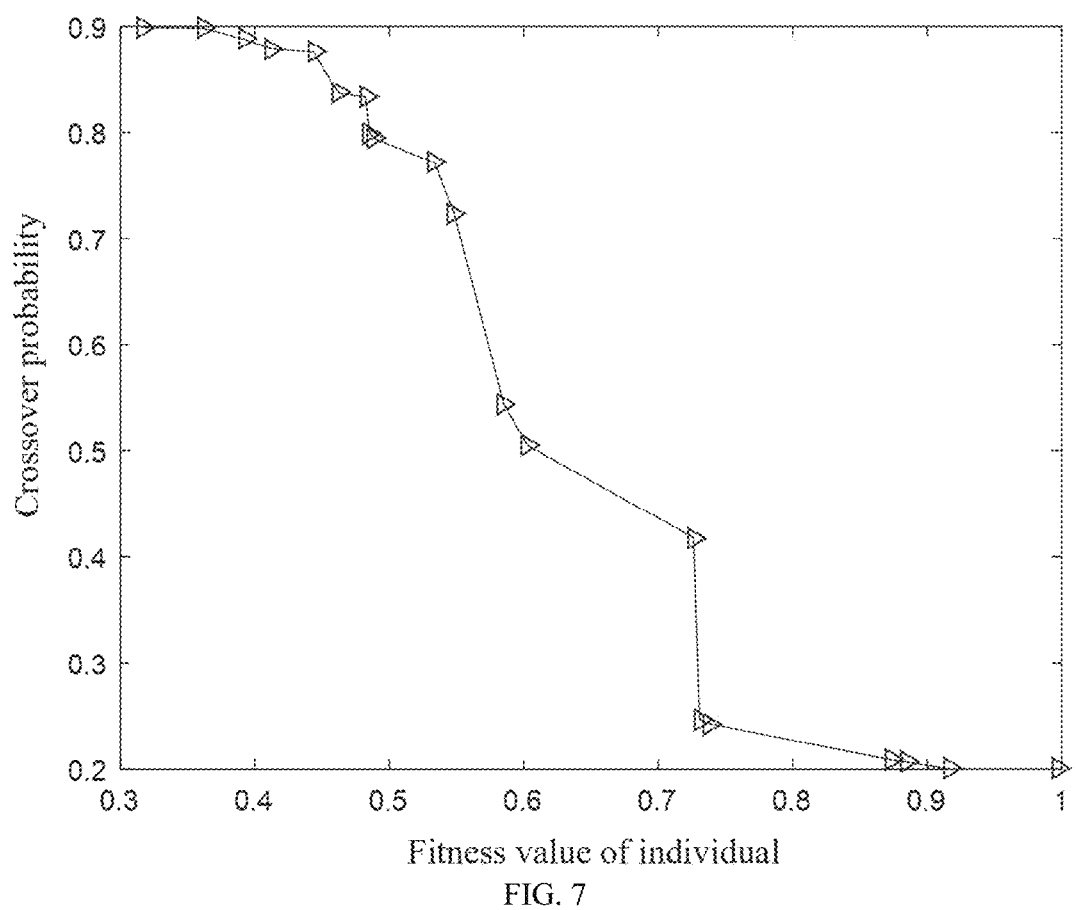
FIG. 7 is a realistic simulation diagram showing the adaptive crossover probability changing with the fitness value of the present embodiment.
Figure 8:
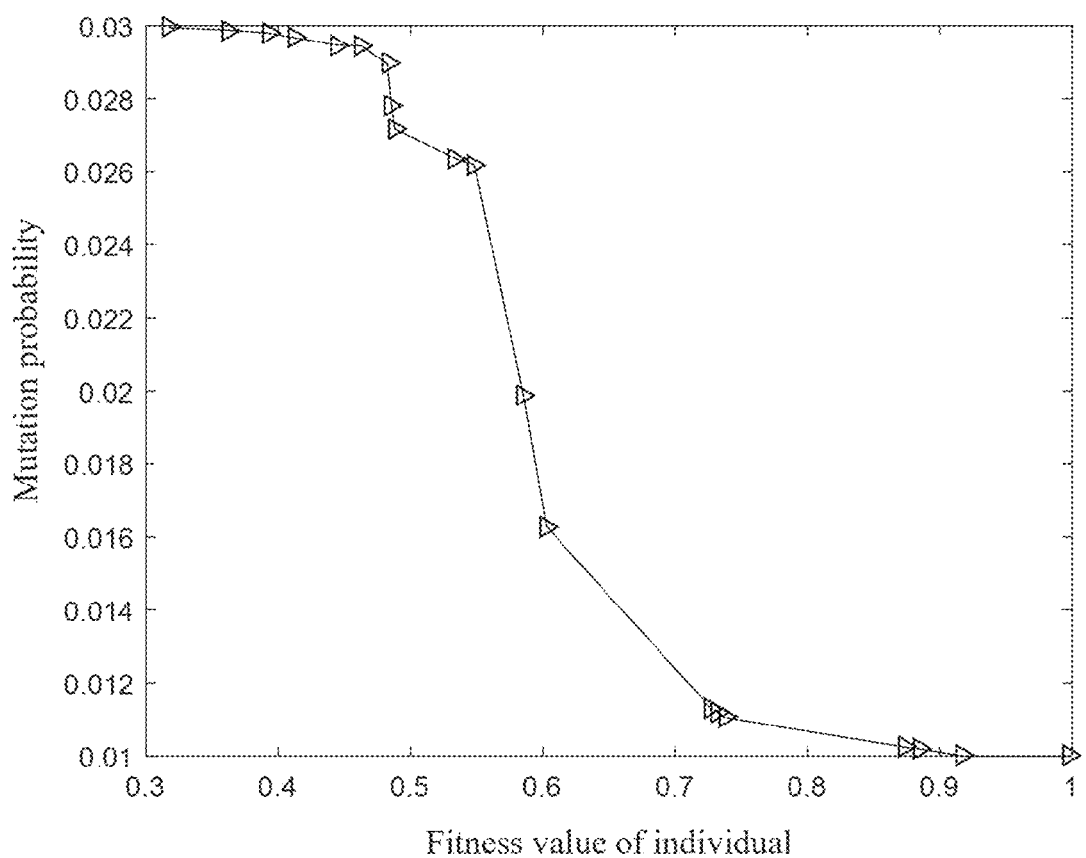
FIG. 8 is a realistic simulation diagram showing the adaptive mutation probability changing with the fitness value of the present embodiment.

FIG. 7 is a realistic simulation diagram showing the adaptive crossover probability changing with the fitness value of the present embodiment; FIG. 8 is a realistic simulation diagram showing the adaptive mutation probability changing with the fitness value of the present embodiment. As shown in FIG. 7 and FIG. 8, when most fitness values at a relatively low level, setting their crossover and mutation probabilities higher.

Further, in the embodiment of the present invention, $q_{max}$ is between 500 and 600.

Obviously, it should be noted that the above descriptions are only preferred embodiments of the invention together with the underneath technical principles. A person skilled in the art understands that the invention is not limited to the particular embodiments described herein and that it is possible for a person skilled in the art to make any appreciable variation, readjustment or replacement without departing from the scope of protection of the invention. Therefore, although the present invention is described in more detail through the above embodiments, the present invention is not limited to the above embodiments, but may include many other equivalent embodiments without departing from the conception of the present invention, and the scope of the present invention is determined by the scope of the appended claims.

We claim:

1. A clustering routing optimization method based on adaptive evolutionary algorithm for a wireless sensor network, comprising the following steps:

Step 1, deploying a multitude of sensor nodes randomly in a monitoring area, establishing a network energy consumption model, acquiring a distance between each pair of the multitude of sensor nodes according to a received signal strength; performing population initialization according to a multitude of initial positions and energy information of the multitude of the sensor nodes, setting q as a number of iteration, with an initial value of q=0; setting $q_{max}$ as a maximum number of iteration, and $q_{max}$ being a positive integer greater than 30;

denoting a size of a population as m, an x-th individual in the population as C(x), assigning a length of each individual to be a number of the multitude of sensor nodes n, thus obtaining a population set as $$Pop = \bigcup_{x=1}^{m} C(x),$$

a set of individuals as $C(x) = \{B_1, B_2, B_3, \ldots B_i \ldots, B_n\}$, wherein $B_i$ denoting a value of a gene on an i-th individual, $B_i$ being determined by energy of node $S_i$, an average energy of surviving nodes in the network and a threshold T(s), wherein T(s) being shown as:

$$T(s) = \begin{cases} \dfrac{p}{1 - p \times [r \bmod(1/p)]} & \text{if } s \in G \\ 0 & \text{otherwise} \end{cases};$$

wherein, p being a ratio of a number of cluster heads to a total number of nodes, p=0.05, r being a number of current rounds, and G being a set of nodes failing to become a cluster head in previous 1/p rounds;

randomly generating a 0~1 random number for each node and comparing it with a threshold T(s); defining:

$$C(x, i) = B_i = \begin{cases} 1 & S_i.E \geq E_{avgAlive}, \, rand \leq T(s) \\ 0 & 0 \leq S_i.E < E_{avgAlive} \\ -1 & S_i.E < 0 \end{cases},$$

wherein $S_i \cdot E$ representing a remaining energy of node $S_i$, $E_{avgAlive}$ denoting an average energy of surviving nodes in the network;

Step 2, constructing a fitness function of the evolutionary algorithm for the x-th individual based on average energy of nodes, average energy of next-hop nodes, average node degree of next-hop nodes, sum of distances from each cluster head node to a base station and sum of distances from each member node to a corresponding cluster head as:

$$f(x) = \frac{E_{avg} + E_{next-avg} + D_{degreen}}{E_{sum}},$$

$$E_{sum} = e^{E_{sum1} + E_{sum2}},$$

$$E_{sum1} = \frac{sumD_{CH \to BS}(x) - minpopD_{CH \to BS} + 1}{1 + avgpopD_{CH \to BS}},$$

$$E_{sum2} = \frac{sumD_{S \to CH}(x) - minpopD_{S \to CH} + 1}{1 + avgpopD_{S \to CH}},$$

wherein, $E_{avg}$ denoting the average energy of the node, $E_{next-avg}$ representing the average energy of the next-hop node, $D_{degreen}$ being the average node degree of next-hop node, $sumD_{CH \to BS}(x)$ representing the sum of the distances from said each cluster head node to the base station, and $sumD_{S \to CH}(x)$ denoting the sum of the distances from said each member node to the corresponding cluster head, $minpopD_{CH \to BS}$ denoting a minimum value of the sum of the distances from each cluster head nodes to the base station for all individuals in the population, $minpopD_{S \to CH}$ representing a minimum value of the sum of the distances from the member nodes of all individuals in the population to the corresponding cluster head, $avgpopD_{CH \to BS}$ denoting an average of the sum of the distances from said each cluster head node to the base station for all individuals in the population, $avgpopD_{S \to CH}$ representing an average of the sum of the distances from the member nodes to the corresponding cluster head for all individuals in the population;

Step 3, constructing an adaptive crossover probability formula as:

$$P_c(x) = P_{c2} + \frac{P_{c1} - P_{c2}}{1 + P_e},$$

$$P_e = e^{10 \cdot \frac{f(x) - f_{avg}}{f_{max} - f_{avg}}},$$

wherein $P_{c1}$ and $P_{c2}$ being upper and lower bound of crossover probability adaptive adjustment, respectively; upper bound being: $P_{c1}=F_1(f'(x))=P_c-\Delta f'(x)*(-0.1)$, $P_{c2}<P_{c1} \leq 0.97$, when $P_{c1}$ being greater than 0.97, upper bound of crossover probability being set to 0.97, $\Delta f'(x)$ being a variation trend of the fitness value $f(x)$, and the lower bound $P_{c2}=0.1$, $f_{max}$ being a maximum value of individuals fitness value in the population, $f_{avg}$ being an average value of individuals fitness value in the population;

Step 4, constructing an adaptive mutation probability formula as:

$$P_m(x) = P_{m2} + \frac{P_{m1} - P_{m2}}{1 + P_e}, P_e = e^{10 \cdot \frac{f(x) - f_{avg}}{f_{max} - f_{avg}}},$$

wherein $P_{m1}$ and $P_{m2}$ being upper and lower bound of mutation probability adjustment, respectively; the upper bound being: $P_{m1}=F_2(f'(x))=P_m-\Delta f'(x)*(-0.01)$, and lower bound $P_{m2}=0.01$, $P_{m2}<P_{m1} \leq 0.1$, when the $P_{m1}$ being greater than 0.1, the upper bound of mutation probability being set to 0.1, $\Delta f'(x)$ being the variation trend of the fitness value $f(x)$, $f_{max}$ being the maximum value of individuals fitness value in the population, $f_{avg}$ being the average value of individuals fitness value in the population;

Step 5, constructing a selection rule: while preserving the individual H with the highest fitness value in the current population, letting individual H continue to participate in crossover and mutation operations, and if a worst-performing individual L in the next generation having a smaller fitness value than individual H in the previous generation, replacing individual L directly with individual H, defining two sets as:

$$\begin{cases} C_{max} = \{C_{max}(k): f[C_{max}(k)] = \\ \max[f(C(k))] \mid C_{max}(f) \in \text{Pop}(k), k = 1, 2, \ldots\} \\ C_{min} = \{C_{min}(k): f[C_{min}(k)] = \\ \min[f(C(k))] \mid C_{min}(f) \in \text{Pop}(k), k = 1, 2, \ldots\} \end{cases},$$

wherein $C_{max}(k)$ and $C_{min}(k)$ representing an optimal and an inferior individuals in the k-th generation population Pop(k), respectively, $f[C_{max}(k)]$ and $f[C_{min}(k)]$ being the fitness value of the corresponding individual, if $f[C_{max}(k)]>f[C_{min}(k+1)]$, then $C_{min}(k+1)=C_{max}(k)$, $f[C_{min}(k+1)]=f[C_{max}(k)]$;

Step 6, calculating the fitness value according to the fitness function in Step 2, setting q=q+1; performing selection, adaptive crossover and mutation operations based on the fitness value to generate new populations; with each point on the individual having a chance of crossover and mutation, upper and lower bounds of the crossover and mutation operators being adjusted with a trend of the fitness values, and probabilities of crossover and mutation being adjusted nonlinearly with the size of the individual fitness values; most individuals in the population that being smaller than the average performing crossover and mutation with a high probability, and a multitude of excellent individuals larger than the average performing crossover and mutation with a lower probability;

Step 7, activating a perturbation incentive factor $\delta_T$ to avoid local convergence at convergence of the fitness value, the convergence denoting that a change rate of fitness value obtained by continuously calculating the fitness value function for 5 times being less than 0.01 after Step 6, T being the moment when the algorithm tends to converge, adjusting the crossover probability $P_c$ to 0.5 and the mutation probability $P_m$ to 0.05, and proceeding to Step 6, calculating the fitness value, if no larger fitness value being generated, it being considered that the algorithm is currently converging to the optimal state, proceeding to step 9; if a better fitness value being produced, continuing to perform step 8;

Step 8, determining whether q reaches the iteration stopping condition that a number of iterations is no less than the maximum fitness value $q_{max}$, if $q<q_{max}$, proceeding to step 6; if $q=q_{max}$, proceeding to step 9;

Step 9, clustering a multitude of network nodes according to the clustering scheme in the population individuals, determining whether the cluster head is within the communication range of the base station, if yes, the cluster head communicating directly with the base station; otherwise, selecting the cluster head node as the relay node that is closer to the base station than the current cluster head, routing the data packet to the relay node until the packet is delivered to the base station.

2. The adaptive evolutionary algorithm-based clustering routing method for WSNs of claim 1, wherein $q_{max}$ is between 500 and 600.

* * * * *